UNITED STATES PATENT OFFICE.

ALBERT W. MAASS, OF MERIDIAN, MISSISSIPPI.

IMPROVEMENT IN THE TREATMENT OF PINE LEAVES FOR THE MANUFACTURE OF PAPER, AND FOR OTHER PURPOSES.

Specification forming part of Letters Patent No. 221,687, dated November 18, 1879; application filed April 2, 1879.

*To all whom it may concern:*

Be it known that I, ALBERT W. MAASS, of Meridian, in the county of Lauderdale and State of Mississippi, have invented certain new and useful Improvements in the Treatment of Pine Leaves to adapt them to the Manufacture of Paper, and for other purposes; and I do hereby declare that the following is a full, clear, and exact description thereof, which will enable others skilled in the art to which it appertains to make and use the same.

In the treatment of pine leaves or needles, as heretofore practiced, to adapt them for use as stuffing or upholstering material, the needles have been boiled in a solution of soda or caustic soda, for the purpose of removing the resinous substance which they contain, after which they have been dried and disintegrated for the purpose of segregating the fibers; but this process is objectionable, because boiling the green leaves in caustic soda, lime, or potash, imparts to the fibers a dark brownish color, which, while it does not affect the value or utility of the material for upholstering purposes, makes it impossible to use it in the manufacture of white or cream colored writing or printing paper, or the better grades of wrapping-paper.

By my improved process, as hereinafter described, I produce an elastic fibrous material of a nearly white or light straw color, suitable for paper-making, as well as for upholstering purposes, and free from any unpleasant odor.

To prepare this improved material, I proceed as follows: The green pine leaves or needles are first shredded or segregated by suitable machinery, or by passing them between rollers, which thoroughly separate the longitudinal fibers of which each leaf is composed. By performing this process while the leaves are in a green state, the gum or resinous matter is caused to exude, while the process of boiling the needles before subjecting them to the process of disintegration has the effect of closing the pores and hardening the resin, making it much more difficult to remove this and other foreign matter by washing.

After the green leaves have been thoroughly mashed or disintegrated, they are placed in a vessel, and cold water, containing a quantity of ordinary soap in solution is poured over them, after which they are left to steep for a suitable time. After steeping, they are thoroughly washed in several waters to rinse out the last traces of resin and soap, after which the water is removed by pressure, and the material is spread in the sun to dry, or may be dried by artificial means, after which it is ready for use.

I am aware that it is not new to segregate the fibrous parts of plants in a green state by combing and rubbing the plants, either by hand or by machinery, while they are immersed in water, as described in the Letters Patent No. 31,814, granted to James E. Mallory on the 26th day of March, 1861; but this process I do not claim, nor would it be adapted to the treatment of green pine leaves, because the large proportion of resinous matter contained in them does not readily dissolve in cold water.

It will be observed that, by my process, which is limited to the treatment of pine leaves for the purposes set forth, the greater part of the gummy and resinous matter contained in them is removed by pressing and disintegrating the leaves prior to their immersion and washing in the soap-water, which is merely a secondary, as it constitutes the second step in my process.

The material produced by my process, as described, is of a fresh pleasant odor, and possessing great elasticity, so that it may be used with advantage for upholstering purposes generally.

When used in the paper manufacture, it is treated in like manner as straw; but a greater quantity of pine-fiber pulp may be used with a given quantity of rag-pulp than of straw or wood-fiber pulp.

Having thus described my improvement, I claim and desire to secure by Letters Patent of the United States—

The herein-described process for the treatment of pine leaves, consisting in, first, shredding and pressing the fibers of the leaves while these are in a fresh or green state, and thereby causing the resinous matter contained in them to exude; second, removing said resinous substance from the fibers by washing in soap-water, and then in common water; and, third, drying the fibers to remove all traces of moisture, substantially as and for the purpose set forth.

In testimony that I claim the foregoing as my own I have hereto affixed my signature in presence of two witnesses.

ALBERT W. MAASS.

Witnesses:
L. D. BECK,
P. H. GULLY.